(12) United States Patent
Shan

(10) Patent No.: US 7,289,788 B2
(45) Date of Patent: Oct. 30, 2007

(54) MOBILE GATEWAY FOR SECURE EXTENSION OF ENTERPRISE SERVICES TO MOBILE DEVICES

(75) Inventor: Xueshan Shan, Orefield, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 178 days.

(21) Appl. No.: 10/853,962

(22) Filed: May 26, 2004

(65) Prior Publication Data

US 2005/0266836 A1    Dec. 1, 2005

(51) Int. Cl.
H04M 1/66 (2006.01)
H04M 1/68 (2006.01)
H04M 13/16 (2006.01)

(52) U.S. Cl. .................. 455/410; 455/414.1; 709/229; 726/3; 726/27

(58) Field of Classification Search ............. 455/414.1, 455/410; 709/229; 726/3, 27
See application file for complete search history.

(56) References Cited

U.S. PATENT DOCUMENTS

| | | | |
|---|---|---|---|
| 5,941,947 A * | 8/1999 | Brown et al. ................ | 709/225 |
| 6,219,790 B1 | 4/2001 | Lloyd et al. | |
| 6,324,648 B1 * | 11/2001 | Grantges, Jr. ................. | 726/12 |
| 2002/0069369 A1 * | 6/2002 | Tremain ..................... | 713/201 |
| 2002/0099826 A1 | 7/2002 | Summers et al. | |
| 2002/0188486 A1 | 12/2002 | Gil et al. | |
| 2003/0033445 A1 * | 2/2003 | Simpson et al. ............ | 709/328 |
| 2003/0054810 A1 * | 3/2003 | Chen et al. ................. | 455/422 |
| 2003/0074422 A1 * | 4/2003 | Montemurro et al. ....... | 709/219 |
| 2003/0126136 A1 * | 7/2003 | Omoigui ..................... | 707/10 |
| 2005/0044197 A1 * | 2/2005 | Lai ............................ | 709/223 |
| 2005/0075115 A1 * | 4/2005 | Corneille et al. ........ | 455/456.3 |

FOREIGN PATENT DOCUMENTS

EP    05 25 3242    9/2005

OTHER PUBLICATIONS

U.S. Appl. No. 10/668,577, filed Sep. 23, 2003, Chou et al.
U.S. Appl. No. 10/668,563, filed Sep. 23, 2003, Chou et al.
U.S. Appl. No. 10/674,285, filed Sep. 29, 2003, Chou et al.
J.J. Li et al., "An Adaptable Architecture for Secure Delivery of Converged Services," The 6th International Symposium on Autonomous Decentralized Systems, pp. 1-5, Apr. 2003.
F. Liu et al., "A Distributed Multimodal Dialogue System Based on Dialogue System and Web Convergence," Proc. ICSLP'02, 4 pages, Oct. 2002.
X. Shan et al., "A Case Study of IP Network Monitoring Using Wireless Mobile Devices," Proc. IC3N'01, 4 pages, Oct. 2001.
G. Niklfeld et al., "Architecture for Adaptive Multimodal Dialog Systems Based on VoiceXML," Proceedings of Eurospeech, 4 pages, 2001.

(Continued)

Primary Examiner—William Trost
Assistant Examiner—Ariel Balaoing
(74) Attorney, Agent, or Firm—Ryan, Mason & Lewis, LLP

(57) ABSTRACT

Controlled access to enterprise services is provided for a mobile device in a communication system, via a mobile gateway having a first server and a second server. The first server of the gateway is arranged behind a firewall of the enterprise network and is coupled between the second server and one or more enterprise servers of the enterprise network. The second server is arranged in front of the enterprise firewall and is configured for communication with an operator network associated with the mobile device. The gateway controls interaction between the mobile device and the one or more enterprise servers such that access to one or more associated enterprise services is provided in a secure manner.

20 Claims, 4 Drawing Sheets

OTHER PUBLICATIONS

K. Wang, "Implementation of a Multimodal Dialog System Using Extended Markup Languages," Proc. of the Int. Conf. on Spoken Language Processing, 4 pages, Oct. 2000.

Mobilis General Description, www.activevoice.nl/press/mobilis, pp. 1-26, Mar. 2002.

M. Butrico et al., "Enterprise Data Access from Mobile Computers: An End-to-End Story," Proc. of IEEE 10th International Workshop on Research Issues in Data Engineering, pp. 9-16, 2000.

W. Chou et al., "An Architecture of Wireless Web and Dialogue System Convergence for Multimodal Service Interaction Over Converged Networks," Proc. of IEEE ICCCN, pp. 69-74, 2001.

Y.F. Chen et al., "iMobile EE—An Enterprise Mobile Service Platform," ACM Journal on Wireless Networks, vol. 9, No. 4, pp. 283-297, 2003.

H. He, "What is Service-Oriented Architecture?", http://webservices.xml.com, pp. 1-8, 2003.

"COM, DCOM, and Type Libraries," Platform SDK, Microsoft Interface Definition Language (MIDL) MSDN, http://msdn.microsoft.com, 2 pages, 2004.

"Catalog of OMG CORBA®/IIOP® Specifications," Object Management Group, Inc., (OMG), http://www.omg.org, pp. 1-5, 2002.

N. Pissinou et al., "A Middleware-Based Architecture to Support Transparent Data Access By Mobile Users in Heterogeneous Environments," Proc. of IEEE 10th International Workshop on Research Issues in Data Engineering, pp. 63-70, 2000.

F. Stajano et al., "The Thinnest of Clients: Controlling It All Via Cellphone," ACM Mobile Computing and Communications Review, vol. 2, No. 4, pp. 1-8, 1998.

* cited by examiner

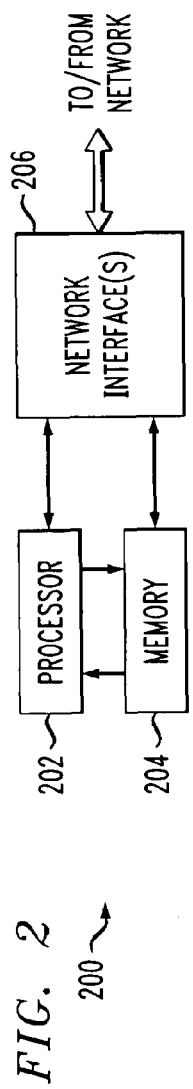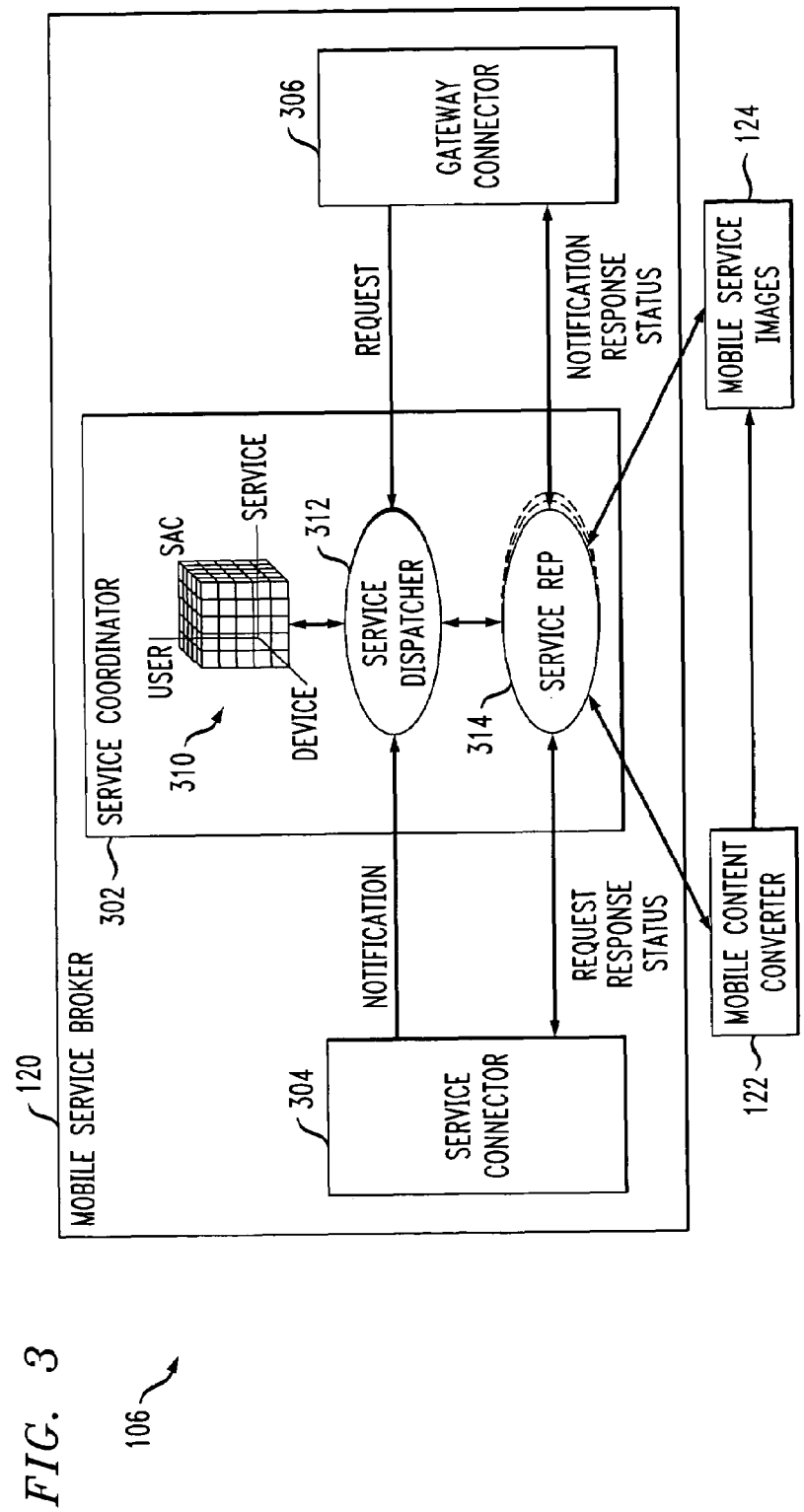
FIG. 2
FIG. 3

US 7,289,788 B2

MOBILE GATEWAY FOR SECURE EXTENSION OF ENTERPRISE SERVICES TO MOBILE DEVICES

RELATED APPLICATION(S)

The present application is related to U.S. patent application Ser. No. 10/668,577, filed Sep. 23, 2003 and entitled "Secure Interaction Between a Mobile Client Device and an Enterprise Application in a Communication System," and U.S. patent application Ser. No. 10/668,563, filed Sep. 23, 2003 and entitled "Voice Message Notification and Retrieval Via Mobile Client Devices in a Communication System," the disclosures of which are hereby incorporated by reference herein.

FIELD OF THE INVENTION

The invention relates generally to the field of communication systems, and more particularly to techniques for controlling access of mobile users to enterprise services.

BACKGROUND OF THE INVENTION

Recent advances in wireless technologies and enterprise networks have made it increasingly desirable to provide secure remote access to enterprise services, such as e-mail, voice mail, web access, and presence-based services, to users who may be traveling, telecommuting or otherwise in a location remote from the enterprise itself. For example, such users will generally want to be able to access an enterprise e-mail server or voice messaging system (VMS) from a mobile device, such as a mobile telephone or personal digital assistant (PDA). It is apparent that substantial improvements in productivity can be achieved by extending enterprise services to the mobile environment, at least in part through more efficient communication and collaboration among teams, groups and organizations.

Unfortunately, conventional techniques have been unable to provide desired levels of security and efficiency for remote access to enterprise services. For example, mobile network operators currently allow corporate clients to access certain corporate services, such as e-mail and voice mail, through mobile telephones. However, these and other conventional arrangements are unduly limited in terms of the particular enterprise services, device configurations, communication protocols and access mechanisms that can be supported, and in certain cases may provide a level of security that is completely inadequate for communication of highly confidential business information.

Accordingly, a need exists for solutions that allow enterprises to extend customized services to a wide array of different types of mobile devices while maintaining full control over access to their networks.

SUMMARY OF THE INVENTION

The present invention meets the above-noted need by providing, in accordance with one aspect of the invention, improved techniques for accessing enterprise services from a mobile device in a communication system.

Generally, controlled access to enterprise services is provided for a mobile device in a communication system, via a mobile gateway having a first server and a second server. The first server of the gateway is arranged behind a firewall of an enterprise network and is coupled between the second server and one or more enterprise servers of the enterprise network. The second server is arranged in front of the enterprise firewall and is configured for communication with an operator network associated with the mobile device. The gateway controls interaction between the mobile device and the one or more enterprise servers such that access to one or more associated enterprise services is provided in a secure manner.

In an illustrative embodiment, the first and second servers of the mobile gateway comprise a mobile image and presentation server and a mobile proxy server, respectively. The mobile image and presentation server comprises a mobile service broker, a mobile content converter, and a mobile service image element, and is coupled to the one or more enterprise servers via a Web Services interface. The mobile proxy server comprises a plurality of gateway adaptors, each configured for communication with a corresponding element of the operator network via a specified protocol. The specified protocol associated with a given one of the gateway adaptors may comprise, by way of example, one of a WAP push protocol, a WAP pull protocol, an SMS protocol and an MMS protocol. The mobile proxy server in the illustrative embodiment is configured to communicate with the operator network over the Internet using an SSL protocol.

BRIEF DESCRIPTION OF THE DRAWINGS

FIG. 2 is a simplified block diagram showing one possible implementation of a processing element of the FIG. 1 system.

FIG. 3 shows a more detailed view of a mobile image and presentation server (MIPS) of the FIG. 1 system.

DETAILED DESCRIPTION OF THE INVENTION

The invention will be described below in conjunction with a number of exemplary communication systems. It should be understood, however, that the invention is not limited to use with any particular type of communication system or any particular configuration of mobile devices, servers, gateways or other processing elements of the system. Those skilled in the art will recognize that the disclosed techniques may be used in any communication system application in which it is desirable to provide improved remote access to enterprise services from a mobile device.

Figure 1:
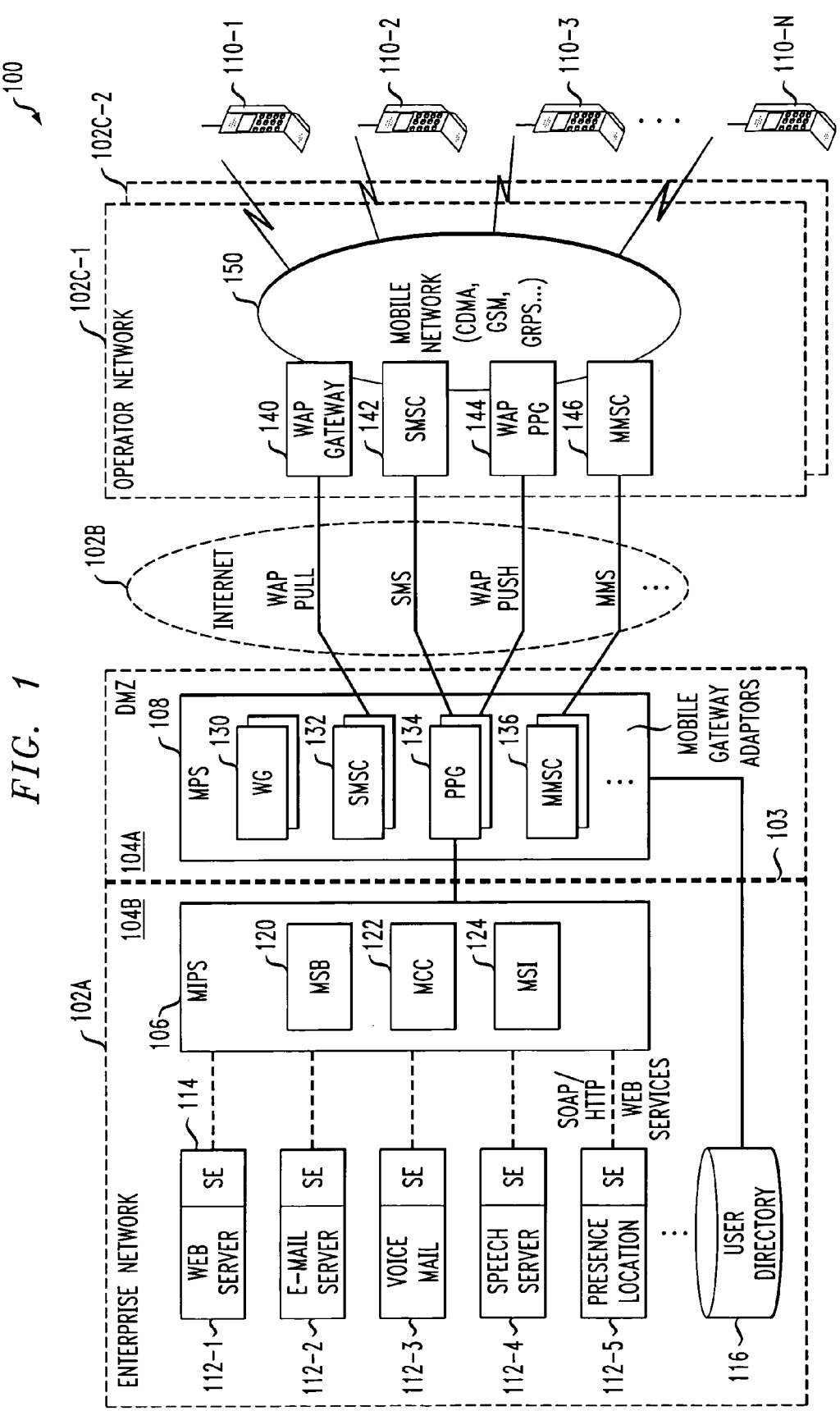
FIG. 1 shows an exemplary communication system configured in accordance with an illustrative embodiment of the invention.

FIG. 1 shows an example communication system 100 in which the present invention is implemented. The system 100 comprises a number of networks 102, including an enterprise network 102A, Internet 102B, and operator networks 102C-1 and 102C-2.

The enterprise network 102A is separated by an enterprise firewall 103 into a first portion 104A and a second portion 104B. The first portion 104A, also denoted herein as a "demilitarized zone" or DMZ portion, is in front of or outside the enterprise firewall 103, and the second portion 104B is behind the enterprise firewall 103. The second portion 104B includes a mobile image and presentation server (MIPS) 106, which is connected to a mobile proxy server (MPS) 108 in the first portion 104A.

The MIPS 106 and MPS 108 in this illustrative embodiment collectively comprise an example of what is more generally referred to herein as a "mobile gateway." Such a gateway is configured to provide mobile users of system 100 with secure access to enterprise services available within the enterprise network 102A. Enterprise services made accessible to a mobile device are also referred to herein as "mobile services."

MIPS 106 in this embodiment comprises a mobile service broker (MSB) 120, a mobile content converter (MCC) 122, and a mobile service images (MSI) element 124. These elements will be described in greater detail below in conjunction with FIG. 3.

Generally, the MPS 108 is operative to authenticate mobile users and to communicate requests, responses, notifications, status and other information between the mobile devices 110 and the MIPS 106 via the operator networks 102C. The MIPS 106 implements functions such as mobile service brokering, mobile device adaptation and content transformation, and mobile service image creation and storage.

The system 100 further includes a plurality of mobile devices 110-1, 110-2, . . . 110-N, each of which may be associated with a different mobile user. The mobile devices 110, although illustrated in FIG. 1 as mobile cellular telephones, may alternatively comprise PDAs, mobile computers, or any other type of processor-based device suitably configured for communication within system 100. Such devices may also be referred to herein as mobile client devices, client devices, or clients. Conventional aspects of these devices are well known in the art and therefore not described in further detail herein.

Also included in the enterprise network 102A is a set of servers 112, each having an associated service extender (SE) 114, and a user directory 116. The set of servers 112 as shown illustratively comprises a web server 112-1, an e-mail server 112-2, a voice messaging system (VMS) or other type of voice mail server 112-3, a speech server 112-4, and a presence location server 112-5. It is to be appreciated, however, that the invention does not require this or any other particular grouping of elements within the enterprise network 102A, and numerous configurations suitable for providing the enterprise network functionality described herein will be readily apparent to those skilled in the art.

In the present embodiment, Web Services interfaces are utilized to couple enterprise applications of the servers 112 to the MIPS 106. Use of such interfaces in the system 100 advantageously provides further separation of service logic from service delivery, thereby facilitating structural extensibility and interoperability of the system platform. The mobile gateway of system 100 can be deployed in conjunction with any existing or new enterprise application that is equipped with a corresponding SE.

Web Services is an industry standard for application integration, and is described in greater detail in W3C, 2003c, "Web Services Architecture," http://www.w3.org/TR/ws-arch, which is incorporated by reference herein. It leverages existing open standards, such as HTTP, TCP/IP, XML, UDDI, WSDL and SOAP, and it is language and platform independent. A given Web Services interface typically comprises one or more documents, which may be written in XML or other suitable language. The data exchanged can be, for example, any XML document, and may be transformed via XSLT or other mechanism in real-time, into a desired format. In a Web Services interface, the data is not confined to simple types and it can be text, images, e-mail, or any type of information. Unlike DCOM and CORBA interfaces, which typically attempt to capture all application behavior by assuming fixed format data exchange, the Web Services interface is simple and dynamic. The Web Services interface provides loose coupling and is cross-platform interoperable, hence proving an excellent approach to transparently accessing distributed and heterogeneous information sources.

Thus, the illustrative embodiment of FIG. 1 utilizes Web Services to interface the MIPS 106 to the enterprise servers 112, thereby achieving a high level of service extensibility as well as cross-platform interoperability. Of course, other types of interfaces may be used between servers 112 and MIPS 106, including interfaces based on other well-known protocols.

The user directory 116 may be configured to store information relating to system mobile users, such as user identification, device, and service subscription information. Such information can be readily stored in an existing enterprise directory, without requiring the establishment of additional user accounts.

The servers 106, 108 and 112, SEs 114, and directory 116 are assumed without limitation to be implemented on one or more computers or other processing elements associated with the enterprise implementing the enterprise network 102A. A given "server" as the term is used herein is therefore intended to include any arrangement of one or more computers or other processing elements configurable to provide the associated processing functionality.

In the illustrative embodiment of FIG. 1, enhanced security is provided by the separation of the MIPS 106 and MPS 108, as well as the coupling of MIPS 106 to enterprise servers 112 via Web Services. The MPS 108 may connect to operator networks 102C using secure sockets layer (SSL) or other secure protocol, and provides secure access to enterprise services by redirecting requests and responses between enterprise applications and mobile users, effectively preventing intruders from accessing sensitive service content.

It should be noted that, although shown as separate elements in the embodiment of FIG. 1, MIPS 106 and MPS 108 in other embodiments may be elements of a single common processing platform. However, MIPS 106 and MPS 108 when implemented on a common processing platform are still preferably logically separated such that the MIPS is behind the enterprise firewall and the MPS is outside the enterprise firewall, as shown in the figure. The term "server" as used herein may refer to MIPS 106, to MPS 108, to a single server which comprises the MIPS and the MPS, or to a set of servers which collectively comprise the MIPS and the MPS.

The enterprise network 102A, or other element of system 100, may comprise one or more software programs running on or otherwise associated with a communication system switch, such as a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc. For example, such switches may be used to implement communication processing functionality associated with one or more of the servers 112, or with other elements of the system 100.

MPS 108 in this example comprises a plurality of adaptors, including WAP gateway (WG) 130, short message service center (SMSC) 132, WAP push proxy gateway (PPG) 134, and multimedia messaging service center (MMSC) 136. These elements of MPS 108 communicate over Internet 102B with corresponding elements 140, 142, 144 and 146, respectively, of operator network 102C-1. The adaptors of the MPS 108 generally assemble service information in a format suitable for a particular messaging technology and a particular network type. For example, in the case of WAP-Over-GPRS, service indication (SI) or service loading (SL) information may be assembled for the delivery of notifications over the GPRS network. In the case of SI notification, information such as a title and URL may be pushed to the mobile device, with actual service content being pulled by the user via activation of the pushed URL. For the SL case, the service content itself is pushed to the mobile device without any pulling. Multiple instances of elements 130, 132, 134 and 136 may be present in the MPS 108, as indicated in the figure.

One important aspect of WAP is the specification of a push architecture that allows content to be sent or "pushed" by server-based applications to a WAP-compliant mobile client device, without requiring an explicit request from the device. The term "push content" as used herein is intended to include any type of information that may be sent to a mobile client device via a push mechanism. Of course, WAP can also be used to allow a WAP-compliant mobile client device to "pull" content from a server-based application, via an explicit request from the device. The MPS 108 in this example may communicate with operator network 102C-1 using WAP pull, WAP push, SMS or MMS, as well as combinations thereof.

The details of WAP are well known to those skilled in the art, and are described in the WAP specification documents, which are hereby incorporated by reference herein. These documents include the following:

WAP Architecture: http://www1.wapforum.org/tech/documents/WAP-210-WAPArch-20010712-a.pdf;

WAP Push Architecture: http://www1.wapforum.org/tech/documents/WAP-250-PushArchOverview-20010703-a.pdf;

PAP: http://www.wapforum.org/what/technical/PROP-PAP-19990816.pdf; and

OTA: http://www1.wapforum.org/tech/documents/WAP-235-PushOTA-20010425-a.pdf.

Although WAP, SMS and MMS are utilized for communications between MPS 108 and operator network 102C-1 in this illustrative embodiment, it should be understood that use of such protocols is not a requirement of the invention. Examples of alternative protocols that may be used to support communication between MPS 108 and one or more operator networks include GPRS, IEEE 802.11, etc.

As shown, operator network 102C-1 may comprise, in addition to elements 140, 142, 144 and 146, a mobile network 150. The mobile network 150 may be based on any desired communication protocol, or set of such protocols, including, by way of example, CDMA, GSM, GPRS, etc. Operator network 102C-2 may be configured in a manner similar to operator network 102C-1, or may utilize a different protocol or set of protocols than operator network 102C-1. Also, the system 100 can be configured to support more or fewer operator networks than the particular number of such networks shown in the figure. The operator networks 102C communicate with the mobile devices 110 as indicated.

The networks 102A, 102B and 102C, taken individually or collectively, may represent, by way of example, a global communication network such as the Internet, an intranet, a wide area network, a metropolitan area network, a local area network, a wireless cellular network, or a satellite network, as well as portions or combinations of these or other wired or wireless communication networks. Implementation of the present invention thus does not require any particular type of network or set of networks.

As indicated above, the illustrative embodiment of FIG. 1 includes a number of WAP-enabled processing elements. WAP generally provides an open, global specification for developing applications that operate over different wireless communication networks. Again, although the illustrative embodiment makes use of WAP and is described in that context, WAP is not a requirement of the invention, and the invention can be implemented using other standard or non-standard protocols.

It is therefore to be appreciated that the simplified configuration of the system 100 as shown in FIG. 1 is for purposes of illustration only, and should not be construed as limiting the invention to any particular arrangement of elements. For example, the system 100 may include additional clients, servers, gateways, routers, switches or other types of processing elements. These and other additional or alternative system elements, of a type known in the art but not explicitly shown in FIG. 1, may be arranged within the system 100 in a manner consistent with well-understood conventional practice.

FIG. 2 shows one possible implementation of a given processing element of the FIG. 1 system. The processing element 200 of FIG. 2 may represent, by way of example, at least a portion of a mobile device 110, one of the servers 106, 108 or 112, or other processing element of the system 100.

The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is also considerably simplified for purposes of illustration. For example, if viewed as representative of a mobile client device, the processing element 200 may include conventional elements typically associated with such a device, such as codecs and other voice signal processing hardware or software elements.

Referring now to FIG. 3, the main functional blocks of the MIPS 106 are shown in greater detail. These include MSB 120, MCC 122 and MSI 124.

Generally, the MSB and its associated elements are utilized in providing system functions such as, for example, service interfacing, service access control, mobile service image creation, backend synchronization, and service coordination.

The MSB 120 comprises a service coordinator 302, a service connector 304, and a gateway connector 306. The service coordinator 302 includes a service access control (SAC) matrix 310, a service dispatcher 312, and multiple service representatives 314.

The service coordinator 302 provides two-way access control on a per-user, per-device and per-service basis, using the SAC matrix 310. The SAC matrix 310 includes a user dimension, a device dimension and a service dimension, and may be built as part of an initialization procedure of the service dispatcher 312, based on registration information characterizing users, devices and services. It is configured to prevent unauthorized access to mobile services from both outside mobile device users and inside enterprise applications. More particularly, the SAC matrix is utilized to deny access, by a user or application, unless all three dimensions associated with a given access attempt agree with a certain registered configuration, that is, a certain user receiving a certain service via a certain device. Such functionality is particularly important when, as in the present embodiment, server-initiated push services are in place. If a user has multiple mobile devices, each such device should be registered with the system in this embodiment.

The MSB 120 is also responsible for the creation and replication of the MSI element 124. The MSI element 124 is created substantially instantaneously from the SAC matrix 310, which eliminates the need for MIPS data backup. Also, large volume access or fault tolerance concerns are addressed since the MSI element can be easily replicated. Furthermore, the MSB performs event-triggered synchronization as well as routine backend synchronization between enterprise applications and MIPS, updating the MSI element accordingly.

Each time a notification or a service request arrives in the service coordinator 302, the SD 312 checks for accessibility against the SAC matrix 310 and dispatches the service request to a particular SR 314. If the notification represents a triggering event, for example, a location change, the SD 312 may also invoke one or more other SRs 314 to chain the requests to reflect the change. Each SR in turn invokes the corresponding Web Services interface via the service connector 304 and passes the response to the MCC 122 for an update of the MSI element 124. Finally, the SR relays the notification to the appropriate gateway connector 306 for delivery. Delivery status information, such as a notification-sent indicator or a content-retrieved indicator, is collected by the SR and is sent back to the service originators for reliability and session management purposes.

The MSI element 124 comprises all mobile service images to which users currently subscribe. It caches service content for better performance and gets rebuilt upon service context changes.

A given mobile service image of the MSI element 124 for a typical enterprise e-mail service may contain, by way of illustrative example, one or more e-mail messages each including a message header, a message body, and one or more attachments.

The term "mobile service image" as used herein is therefore intended to include, without limitation, information characterizing a particular instance of a mobile service.

Figure 4:
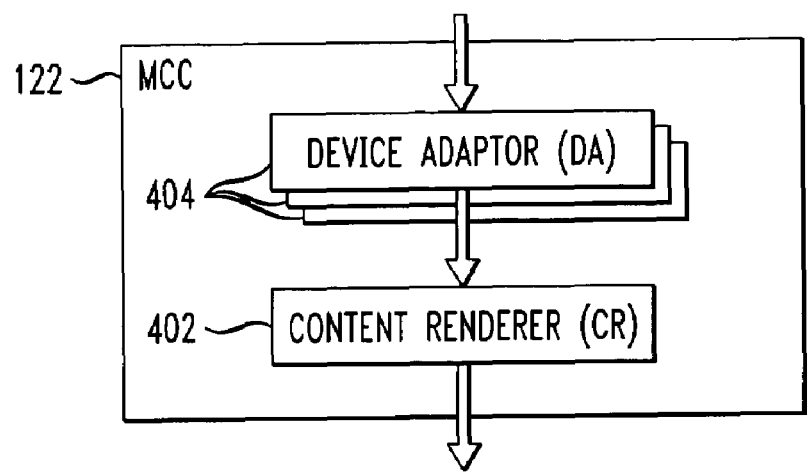
FIG. 4 shows a more detailed view of a mobile content converter (MCC) of the MIPS of FIG. 3.

During the process of service image creation, the MCC 122 transforms the service content into a format most suitable for the target device. The content rendering may be governed by device profiles and user preferences gathered through registration, service activation, and learning processes. Adaptation to new devices is achieved by adding modularized device adaptors. One such implementation of the MCC 122 is shown in FIG. 4. In this example, MCC 122 comprises a content renderer (CR) 402 coupled to a plurality of device adaptors (DAs) 404. Other suitable configurations of the MCC 122 will be readily apparent to those skilled in the art.

The device adaptors 404 provide MCC 122 with an ability to adapt to the capabilities of various user devices. Adding a new device adaptor allows the system to adapt to a new device with a different set of capabilities. Independence of content generation and content presentation may be achieved, by way of example, through the use of XML for content generation and XSLT for content presentation. More specifically, service content received from enterprise applications may be in the form of a generic XML document, which is then transformed in real-time to a format best suitable for presentation on the target mobile device according to device profiles and user preferences. Such decoupling of content generation and presentation is advantageous in that it allows the mobile devices and enterprise applications to be independently configured and upgraded.

A given user typically registers his or her associated mobile device with the system by providing registration information such as basic user and device identifying information and personal preferences. Upon the completion of registration, an appropriate service activation notification will be sent to the newly registered device to confirm user credentials and service subscription. A "home-deck" may be created at this time to reflect the up-to-date SAC matrix entries for the user. Such a home-deck generally comprises a set of personalized information associated with a given user and his or her associated mobile device or devices, and in the illustrative embodiments it is assumed without limitation that the home-deck is generated and stored on MIPS 106.

The basic profiles of the mobile device may be obtained, for example, using information in a header of a service activation form. A suitable evaluation form that contains various selectable fonts, images, color pallets and other related information may be made available to users, as a notification, to allow the users to further evaluate device capabilities as well as user preferences. In embodiments in which WAP push is not supported, similar confirmation and evaluation functionality may be provided through home-deck browsing, or other suitable mechanisms.

A service activation procedure may comprise a logon-based confirmation through notification or home-deck. Notification may be end-to-end secured, through the use of WAP or other suitable protocol. SMS may be used to send a brief notification that only reveals information regarding the readiness of the service content, in order to ensure privacy, with potentially sensitive content being retrieved through the logon-enforced home-deck. A remote clear-cache operation may be implemented on a given mobile device, and initiated after a specified time, in order to secure the service content in the event the device is stolen or lost.

The FIG. 1 system typically creates device profiles and user preferences based on information from a number of different sources. Basic user and device information may be collected during registration. A basic device profile, including information such as model, screen size, and the like, may be retrieved in the above-noted service activation procedure from a request header. More detailed subjective information may then be obtained through a learning-based query procedure.

The system may be configured to support a variety of different interaction paradigms. For example, a combination of notification, browsing, speech-access and click-to-dial may be used to provide effective access to enterprise services. A keyless or one-handed user experience may be achieved via data and voice channel switching or modality switching. Modality switching may involve dialogue combined with content-push and click-to-dial. Event-triggered push notification may be used to deliver urgent services to a mobile device in a timely manner. A backend synchronization mechanism triggers home-deck updates upon changes of context, such as changes in location, presence, calendar, tasks, etc. A link to the home-deck may be pushed to the mobile device for book marking or other processing during the service activation procedure, in order to eliminate the need for user input. The use of simple messaging, such as that deliverable via SMS or a similar protocol, combined with the personalized home-deck reduces mobile device functionality requirements without compromising the service accessibility. This advantageously provides users of low-end "thin" client devices with access to the same enterprise services, and a similar user experience, as users of higher-end devices.

Figure 5:
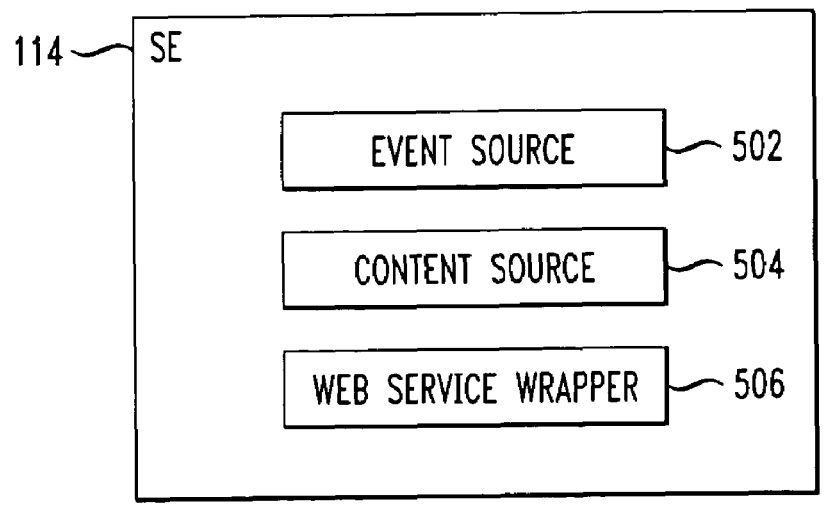
FIG. 5 shows a more detailed view of an example service extender (SE) of the FIG. 1 system.

FIG. 5 shows an exemplary implementation of a given one of the SEs 114 of FIG. 1. As was previously described, the SE is utilized in providing a loose coupling of a corresponding enterprise server to the MIPS 106. As shown, the SE comprises an event source 502, a content source 504, and a Web Services wrapper (WSW) 506. The SE generally detects events or content, and relays them via respective event source 502 and content source 504 to the WSW 506. Examples of events that may be detected include arrival of an e-mail message, a change in calendar, etc. The content source 504 may comprise, by way of example, an XML generator that retrieves service content, such as an e-mail header, message and attachments, and converts it into a common format, such as an XML document. The WSW 506 assembles the event and content in a deliverable form and sends them as SOAP messages over HTTP. Additional security can be achieved at the SOAP level using authentication, digital signature and encryption.

Figure 6:
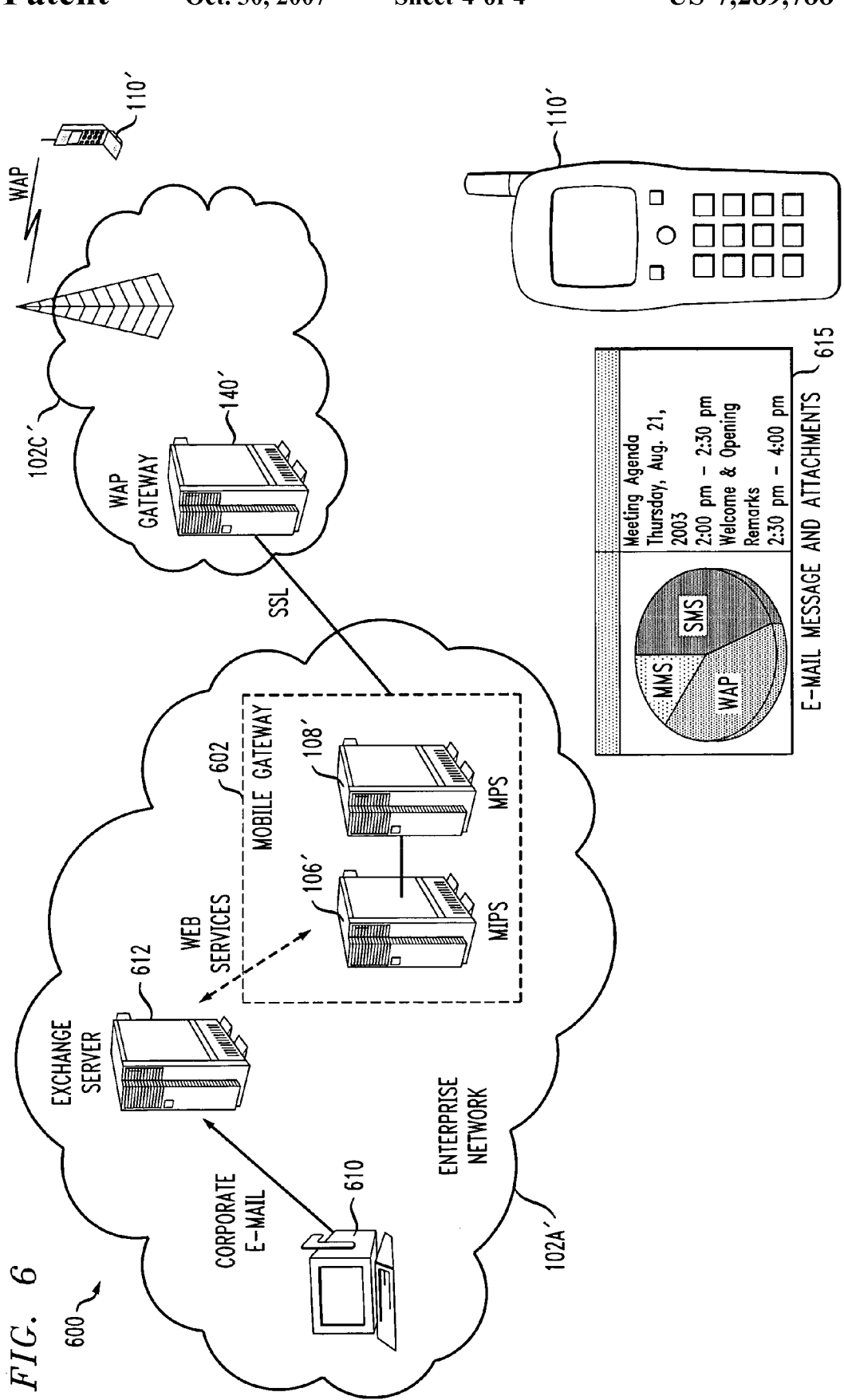
FIG. 6 shows another illustrative embodiment of a communication system in accordance with the invention.

FIG. 6 shows another illustrative embodiment of the invention, in the form of a communication system 600. The system 600 comprises an enterprise network 102A' coupled to an operator network 102C'. The enterprise network includes a mobile gateway 602 which is implemented using MIPS 106' coupled to MPS 108'. The MPS 108' communicates via SSL with WAP gateway 140' of network 102C'. The network 102C' communicates via WAP with a mobile device 110'. Also included in the enterprise network 102A' is a corporate e-mail server 610 coupled to an exchange server 612. The exchange server 612 communicates with the MIPS 106' via a Web Services interface.

Elements 102A', 102C', 106', 108', 110' and 140' of the system 600 operate in substantially the same manner as the corresponding elements of system 100 of FIG. 1.

The MPS 108' in this illustrative embodiment may be implemented, by way of example, as a Microsoft Mobile Information Server (MIS), suitably deployed in the enterprise DMZ to manage and authenticate users. It securely connects with the WAP gateway 140' of the operator network 102C' via SSL and provides secure browsing by redirecting requests and responses. Although not explicitly shown in the figure, gateway adaptors for WAP pull, WAP push and SMS are implemented in system 600 to connect the mobile gateway 602 with the operator network 102C'. WAP-over-GPRS is used as a bearer for both browsing and notification traffic.

The MIPS 106' includes components for service brokerage, basic real-time content transformation, and service image creation and storage. More specifically, it includes an MSB, having a simple SD and a configurable SR, implemented to process requests and responses between the mobile device 110' and the enterprise applications associated with servers 610 and 612. Also included in the MIPS 106' is a device adaptor for the mobile device 110', which may be, for example, a Sony-Ericsson T68i mobile telephone. The device adaptor is utilized in conjunction with an associated content rendering element, to transform generic XML documents received from the enterprise applications, using XSLT, into XHTML and WML in real-time. The MIPS 106' further includes an MSI that is able to generate service images and link them with a personalized home-deck for browsing.

The Web Services interface may be implemented using, for example, a Microsoft SOAP Toolkit. A SOAP server/client pair may be implemented for each side of the interface, such that enterprise applications may choose either to expose Web Services to the mobile gateway 602 or to consume Web Services exposed by the mobile gateway 602.

Associated with the exchange server 612 in this embodiment is an SE for an e-mail application. When a new e-mail message arrives, a notification is sent to the mobile device using either WAP push or SMS, depending upon the messaging capability of the mobile device. Meanwhile, the personalized home-deck is updated to include a new link to the new message. The SE traps the new e-mail event, then extracts and processes the message. All processed message parts are encoded into an XML document. The XML document is delivered to the mobile gateway 602 over HTTP, through the Web Services interface, for mobile-specific processing. The mobile gateway 602 then relays the mobile format notification to the WAP gateway 140'. A WAP push or SMS message is made available immediately on the mobile device. By activating an appropriate key on the mobile device, the user retrieves the e-mail message and attachments 615 as shown in the figure. The attachments can be either text or non-text. The notification may comprise an SMS message indicating that a new e-mail message is ready on the password-protected home-deck, in case WAP push is not supported. This allows the user to access the same information from a low-end device without compromising security, privacy or convenience.

Numerous other enterprise services can be made accessible to mobile users via the system 600. For example, it is also possible to provide an extension to the above-described mobile e-mail service that allows speech access to corporate e-mail. To support such an extension, a new SE is created for a speech server of the enterprise network, and a user gains access to corporate e-mail through a dialogue application. While listening to a new e-mail message with a non-text attachment, the user may speak a voice command such as "show me." The non-text attachment along with the message will then be made available immediately on the mobile device.

As previously noted, one or more of the processing functions described above in conjunction with the illustrative embodiments of the invention may be implemented in whole or in part in software utilizing processor 202 and memory 204 associated with a processing element of the system. Other suitable arrangements of hardware, firmware or software may be used to implement the techniques of the invention.

It should again be emphasized the above-described arrangements are illustrative only. For example, alternative embodiments may utilize different processing element hardware, firmware or software configurations, different push, pull or messaging mechanisms, and different communication protocols than those of the illustrative embodiments. These and numerous other alternative embodiments within the scope of the following claims will be apparent to those skilled in the art.

What is claimed is:

1. An apparatus for use in controlling access to an enterprise service of an enterprise network from a mobile device in a communication system, the apparatus comprising:

a gateway having a first server and a second server;
the first server of the gateway being arranged behind a firewall of the enterprise network and being coupled between the second server and one or more enterprise servers of the enterprise network;
the second server being arranged in front of the firewall and being configured for communication with an operator network associated with the mobile device;
wherein the gateway controls interaction between the mobile device and the one or more enterprise servers such that access to one or more associated enterprise services is provided in a secure manner;
wherein the gateway is configured to provide access control based on a stored multi-dimensional service access control matrix comprising at least a user dimension, a service dimension and a device dimension, the device dimension identifying mobile devices assigned to users identified by the user dimension, the service dimension identifying services accessible to said users via the mobile devices identified by the device dimension, a given entry in the service access control matrix comprising a particular permissible combination of a user identifier, a service identifier and a device identifier;
the gateway is configured to create at least one mobile service image based at least in part on the service access control matrix;
the gateway is configured to update the at least one mobile service image upon receipt of at least one of a notification or a service request; and
wherein the gateway is configured to deny a given access attempt initiated by one of the users identified by the user dimension from one of the mobile devices identified by the device dimension unless a combination of its associated user identifier, service identifier and device identifier corresponds to an entry in the service access control matrix.

2. The apparatus of claim 1 wherein the first server comprises a mobile image and presentation server.

3. The apparatus of claim 1 wherein the first server comprises one or more of a mobile service broker, a mobile content converter, and a mobile service image element.

4. The apparatus of claim 3 wherein the mobile service broker comprises a service coordinator configured to provide two-way access control utilizing the service access control matrix, the service access control matrix being constructed at least in part in conjunction with an initialization procedure based on registration information characterizing users, devices and services.

5. The apparatus of claim 4 wherein the service coordinator is operative to prevent unauthorized access to the enterprise services from the mobile device and from one or more enterprise applications.

6. The apparatus of claim 3 wherein the mobile service broker comprises a service dispatcher which communicates with a service representative.

7. The apparatus of claim 3 wherein the mobile service broker is operative to replicate the mobile service image element in conjunction with a service request from the mobile device.

8. The apparatus of claim 3 wherein the mobile content converter comprises a plurality of device adaptors, each associated with a particular type of mobile device, and a content renderer coupled to the device adaptors, the mobile content convener being operative via one or more of the device adaptors and the content renderer to transform enterprise service content into a format suitable for presentation to a user via the mobile device.

9. The apparatus of claim 1 wherein the first server is coupled to the one or more enterprise servers via a Web Services interface.

10. The apparatus of claim 1 wherein the second server comprises a mobile proxy server.

11. The apparatus of claim 1 wherein the second server comprises a plurality of gateway adaptors, each configured for communication with a corresponding element of the operator network via a specified protocol.

12. The apparatus of claim 11 wherein the specified protocol associated with a given one of the gateway adaptors comprises one of a WAP push protocol, a WAP pull protocol, an SMS protocol and an MMS protocol.

13. The apparatus of claim 1 wherein the second server is configured to communicate with the operator network over the Internet using an SSL protocol.

14. The apparatus of claim 1 wherein the one or more enterprise servers comprise one or more of a web server, an e-mail server, a voice mail server, a speech server and a presence location server.

15. The apparatus of claim 1 wherein associated with each of a plurality of enterprise applications corresponding to respective ones of the enterprise servers is a service extender which supports communication between the enterprise application and the first server of the gateway.

16. The apparatus of claim 1 wherein the first and second servers are implemented on a single common processing element of the system.

17. The apparatus of claim 1 wherein the first and second servers are implemented on respective first and second processing elements of the system that are physically separated from one another.

18. The apparatus of claim 1 wherein the gateway is implemented in the form of one or more processing elements, each of the processing elements comprising a processor coupled to a memory.

19. A method for use in controlling access to an enterprise service of an enterprise network from a mobile device in a communication system, the method comprising the step of:
controlling interaction between the mobile device and one or more enterprise servers of the enterprise network via a gateway having a first server and a second sewer, such that access to one or more associated enterprise services is provided in a secure manner;
the first server of the gateway being arranged behind a firewall of the enterprise network and being coupled between the second server and one or more enterprise servers of the enterprise network;
the second server being arranged in front of the firewall and being configured for communication with an operator network associated with the mobile device;
wherein the gateway is configured to provide access control based on a stored multi-dimensional service access control matrix comprising at least a user dimension, a service dimension and a device dimension, the device dimension identifying mobile devices assigned to users identified by the user dimension, the service dimension identifying services accessible to said users via the mobile devices identified by the device dimension, a given entry in the service access control matrix comprising a particular permissible combination of a user identifier, a service identifier and a device identifier;

the gateway is configured to create at least one mobile service image based at least in part on the service access control matrix;

the gateway is configured to update the at least one mobile service image upon receipt of at least one of a notification or a service request; and wherein the gateway is configured to deny a given access attempt initiated by one of the users identified by the user dimension from one of the mobile devices identified by the device dimension unless a combination of its associated user identifier, service identifier and device identifier corresponds to an entry in the service access control matrix.

20. An article of manufacture comprising a machine-readable storage medium encoded with software code for use in controlling access to an enterprise service of an enterprise network from a mobile device in a communication system, wherein the software code when executed implements the step of:

controlling interaction between the mobile device and one or more enterprise servers of the enterprise network via a gateway having a first server and a second server, such that access to one or more associated enterprise services is provided in a secure manner;

the first server of the gateway being arranged behind a firewall of the enterprise network and being coupled between the second server and one or more enterprise servers of the enterprise network;

the second server being arranged in front of the firewall and being configured for communication with an operator network associated with the mobile device;

wherein the gateway is configured to provide access control based on a stored multi-dimensional service access control matrix comprising at least a user dimension, a service dimension and a device dimension, the device dimension identifying mobile devices assigned to users identified by the user dimension, the service dimension identifying services accessible to said users via the mobile devices identified by the device dimension, a given entry in the service access control matrix comprising a particular permissible combination of a user identifier, a service identifier and a device identifier;

the gateway is configured to create at least one mobile service image based at least in part on the service access control matrix;

the gateway is configured to update the at least one mobile service image upon receipt of at least one of a notification or a service request; and wherein the gateway is configured to deny a given access attempt initiated by one of the users identified by the user dimension from one of the mobile devices identified by the device dimension unless a combination of its associated user identifier, service identifier and device identifier corresponds to an entry in the service access control matrix.

* * * * *